June 24, 1958  V. G. SHARPE  2,840,438
ADJUSTABLE REFRIGERATOR SHELF
Filed July 19, 1957  3 Sheets-Sheet 1

INVENTOR.
Verlos G. Sharpe
BY Edwin S. Dybvig
HIS ATTORNEY

June 24, 1958

V. G. SHARPE 2,840,438

ADJUSTABLE REFRIGERATOR SHELF

Filed July 19, 1957

INVENTOR.
Verlos G. Sharpe
BY Edwin S. Dybvig
HIS ATTORNEY

United States Patent Office 2,840,438
Patented June 24, 1958

2,840,438
ADJUSTABLE REFRIGERATOR SHELF

Verlos G. Sharpe, Dayton, Ohio, assignor to General Motors Corporation, Detroit, Mich., a corporation of Delaware Application July 19, 1957, Serial No. 673,014

10 Claims. (Cl. 312—322)

This invention relates to refrigerators and particularly to a shelf arrangement therefor.

An object of my invention is to improve the interior arrangement of a refrigerator cabinet so as to increase the accessibility of food products on shelves in the food storage compartment thereof.

Another object of my invention is to provide a simplified and low-cost means for slidably and rotatably supporting a shelf within a food storage compartment of rectangular shape in cross section of a refrigerator cabinet which shelf will while being so supported occupy a maximum of the food compartment so as not to create too much waste space.

A further object of my invention is to provide in the food storage compartment of a refrigerator cabinet a novel form of shelf supporting means which permits sliding of a shelf part way out of the compartment, rotation of the shelf in either one of two directions to dispose a portion thereof further outwardly of the compartment and revolving of the shelf continuously in one direction while it is slid out of the compartment to change its height and vary the distance between it and other shelves in the compartment.

A still further object of my invention is to provide within a rectangularly shaped in cross section food storage compartment a slidable and rotatable shelf composed of side by side companion food supporting sections either of which can be moved outwardly of the compartment and removed from its supporting means so as to utilize same as a serving tray for the portage of food products to and fro the refrigerator cabinet.

In carrying out the foregoing objects it is a further and more specific object of my invention to provide a shelf arrangement in a refrigerator cabinet which will render food products stored in the cabinet easily accessible to thereby increase the utility of the cabinet and of the food supporting shelf itself.

Further objects and advantages of the present invention will be apparent from the following description, refereence being had to the accompanying drawings, wherein a preferred form of the present invention is clearly shown.

Figure 1:
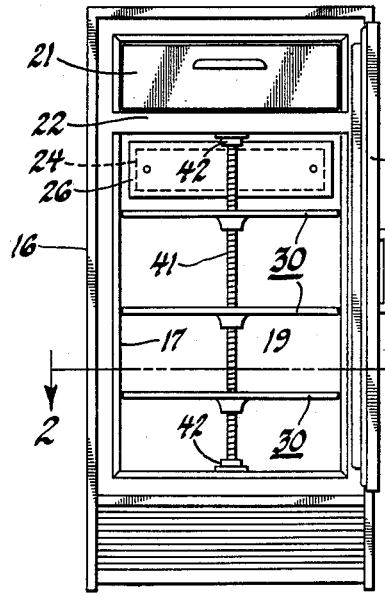
Figure 1 is a front view of a household refrigerator cabinet with the food storage compartment door thereof in open position and showing my shelf arrangement in the compartment.

Referring to the drawings for illustrating my invention, I show in Figure 1 thereof a household refrigerator cabinet of rectilinear configuration and comprising an outer shell or panels 16 and an inner metal liner 17 with any suitable insulating material 18 (see Figure 2) disposed therebetween as is conventional in the art. The insulated walls or wall structure forms or defines a top, bottom and upright back and side walls of a food storage compartment or chamber 19 within the refrigerator cabinet. Compartment 19 is also of rectilinear configuration and is rectangular in horizontal cross section. The cabinet may include a separate freezing compartment, closed by an inner door 21, and isolated from compartment 19 by a rigid insulated wall 22. Compartment 19 has an open front or front access opening normally closed by an insulated door structure 23, shown in open position in Figure 1, hingedly mounted on the refrigerator cabinet for horizontal swinging movement relative thereto. Door 23 extends continuously from the bottom of compartment 19 over inner door 21 of the upper freezing compartment to close the open front of the refrigerator. The upper freezing compartment in the refrigerator is cooled by an evaporator of a refrigerating system (not shown) associated with the refrigerator cabinet which evaporator may be in the form of a conduit coiled or wrapped around the outside of and secured to a liner of this freezing compartment. The main food storage compartment 19 may be cooled by a platelike evaporator of the refrigerating system, indicated by the dotted lines 24, mounted on the compartment back wall in spaced relation thereto and covered or concealed by a baffle or plate 26. Evaporator 24 chills and causes circulation of air throughout the interior of compartment 19 to cool and preserve food products stored therein.

Figure 3:
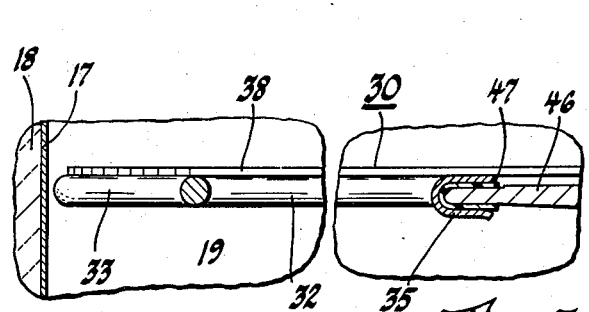
Figure 3 is a broken fragmentary vertical sectional view taken on the line 3—3 of Figure 2 showing the shelf supporting arrangement.

According to my invention and in order to support food products in spaced relation throughout the height of compartment 19 I provide in this compartment a plurality of vertically spaced apart food supporting shelf members generally represented by the reference numeral 30 in Figure 1. The shelves 30 should be supported so as to be readily and quickly movable and/or adjustable independently of one another by the user of the refrigerator cabinet. To this end I mount the shelves for horizontal sliding movement part way out of compartment 19, when door 23 is open, for rotation relative to the cabinet and utilize the rotation to vary the height of a shelf 30 in the compartment with respect to other of the shelves. Each shelf member 30 includes a metal bounding rim or frame member (see Figures 2 and 3) which has straight line parallel front and back sides 31 and 32 respectively and curved ends 33 and 34 respectively. Metal rails 35 rigidly secured in any suitable manner to and extending between the front side 31 and the back side 32 of the bounding rim or frame member are shaped or formed to provide spaced apart opposed parallel track portions on the shelves 30. A metal piece 36 is also rigidly secured to and extends, centrally of curved ends 33 and 34 of shelf 30, intermediate the front side 31 and back side 32 of the shelf bounding rim or frame member and has an elongated opening 37 provided therein for a purpose to be hereinafter described. Each shelf member 30 also includes a plurality of spaced apart wires 38 above and extending transversely across rails 35 and metal piece 36 to provide the shelves with a flat reticulated food supporting surface. The means for supporting shelf members 30 in compartment 19 comprises a stationary upright jack-screw or rigid threaded support 41 located centrally of the front of compartment 19 and locked in suitable locking socket elements 42 secured to wall 22 and to the bottom wall of the food compartment adjacent the compartment access opening. The supporting means for shelves 30 further comprises or includes a spider-like light-weight metal such as aluminum bracket member 44 having a hub portion provided with a spirally threaded bore pivotally mounted or threaded on the threads of jack-screw 41. Ends of four legs 46 of bracket member 44 fit in and cooperate with the track portion of opposed rails 35 to interlock shelf member 30 to bracket member 44 and to provide track means for sliding these members relative to one another. A molded plastic boot or tip 47 is slipped over the end of the four legs 46 of bracket member 44 so as to reduce or minimize friction between the rails 35 of shelf member 30 and bracket member 44 when the shelf is slid relative thereto. The top of bracket member 44 is cut out to slidably receive downwardly directed edges on metal piece 36. Jack-screw 41 extends through the elongated opening 37 in metal piece 36 and this opening permits a shelf member 30 to be slid horizontally relative to both bracket member 44 and the jack-screw. It is the purpose of my shelf arrangement to take advantage in a rectangular refrigerator of features of a rotatable shelf in a circular refrigerator and to at the same time provide for vertical adjustment of a shelf without removing the shelf from the refrigerator cabinet. In this respect it is to be noted that the particular shape or planular configuration of a shelf 30 in the present arrangement permits same to occupy all of the cross sectional area of the rectangular compartment 19 except the small corner portions thereof adjacent the curved ends or sides 33 and 34 of the shelf. This space is relatively unimportant since compartment illuminating lamps are ordinarily extended along the height thereof at the rear of the food compartment. It is to be understood that a shelf 30 cannot be rotated within compartment 19 while the shelf is positioned entirely therein and that rotation or revolutions thereof relative to the cabinet can be effected only after it has been moved part way out of food compartment 19.

Figure 5:
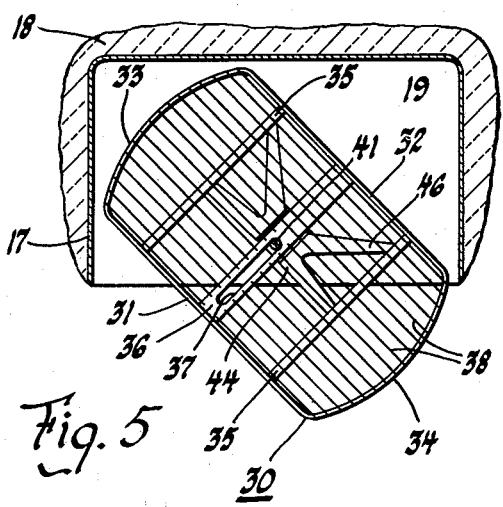
Figure 5 is a view like Figure 4 and shows the shelf in a position after having been rotated relative to the cabinet to dispose a portion of the shelf further outward of the food compartment.
Figure 4:
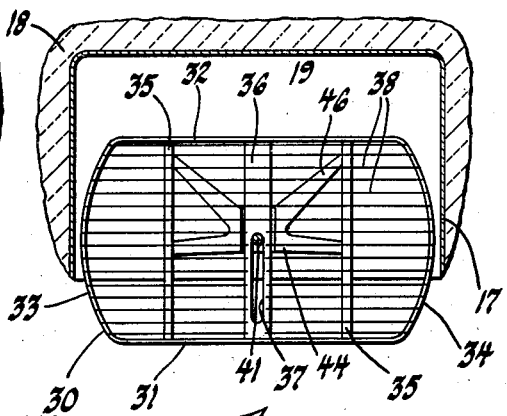
Figure 4 is a fragmentary sectional view similar to Figure 2 on a reduced scale showing the shelf slid part way out of the food storage compartment of the refrigerator cabinet.
Figure 2:
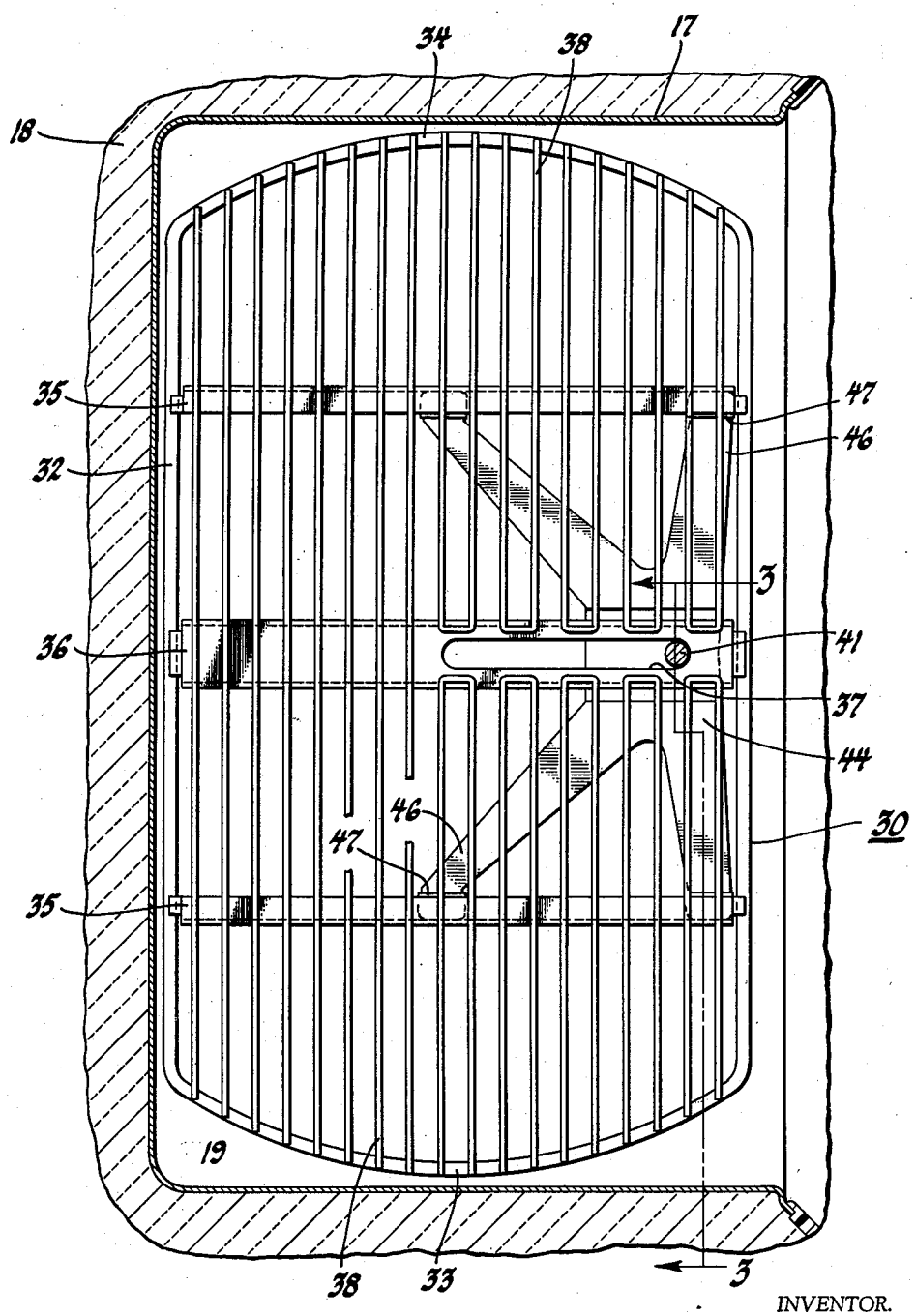
Figure 2 is an enlarged fragmentary horizontal sectional view taken on the line 2—2 of Figure 1 of a slidable, rotatable and vertically adjustable shelf supported in the food compartment of the refrigerator.

Having described the construction and support of a shelf 30 within compartment 19 of the refrigerator cabinet I will now proceed to describe the mode of using a shelf to accomplish certain advantages. Assume that a shelf 30 is in its normal position within food compartment 19 as shown in Figure 2 of the drawings and it is desired to move a part thereof outwardly of the compartment. Main door 23 is opened, as shown in Figure 1 of the drawings, and the front edge of a shelf 30 is grasped by the hand and pulled forwardly of the refrigerator cabinet. This slides the shelf in a straight horizontal line away from the straight or flat rear wall of compartment 19 relative to bracket member 44, along the opposed tracks or rails 35, part way out of the compartment and in so sliding the back end or wall of elongated opening 37 in metal piece 36 strikes the upright support or jack-screw 41 to stop the sliding movement (see Figure 4). If it is desired to move food products supported on shelf 30 at the rear of the curved sides thereof into a more readily accessible position from without the refrigerator the shelf may be rotated in either one of two directions about jack-screw 41 to locate one side portion of the shelf outwardly of compartment 19 a greater distance than all other portions of this shelf (see Figure 5). Thus self 30 is rotatable only after being slid part way out of compartment 19 whereby portions thereof will not strike walls of the compartment. During rotation of shelf 30 bracket member 44 is threaded one way or the other on threads of jack-screw 41 to minutely elevate or lower the shelf and upon reversing this rotating and sliding movement the shelf may be returned to compartment 19 at the same level therein as before it was moved. If it is desired to change the height of shelf 30 within compartment 19 relative thereto and with respect to other of the shelves therein such, for example, as to vary the distance between certain of the shelf members, the shelf while it is slid part way out of compartment 19 may be continuously revolved or rotated throughout 360° or more in either one of two directions. This threads the bracket member 44 upwardly or downwardly along jack-screw 41 to raise or lower the height of a shelf 30 whereafter it is returned to compartment 19 in a different elevated or lowered horizontal plane. Thus my shelf support means includes means responsive automatically to revolving or rotating a shelf continuously in one direction throughout several 360° revolutions without manually supporting the load on a shelf and without operating a separate elevating mechanism or device. The vertical adjustment of a shelf 30 may be made quickly and easily without removing articles supported thereon and without detaching the shelf from the refrigerator cabinet.

Figure 7:
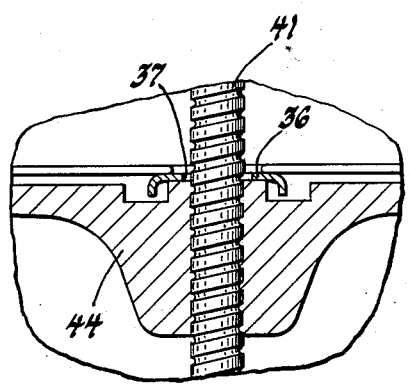
Figure 7 is a view similar to Figure 5 and shows one of the shelf sections disclosed in Figure 6 detached from its supporting means.
Figure 6:
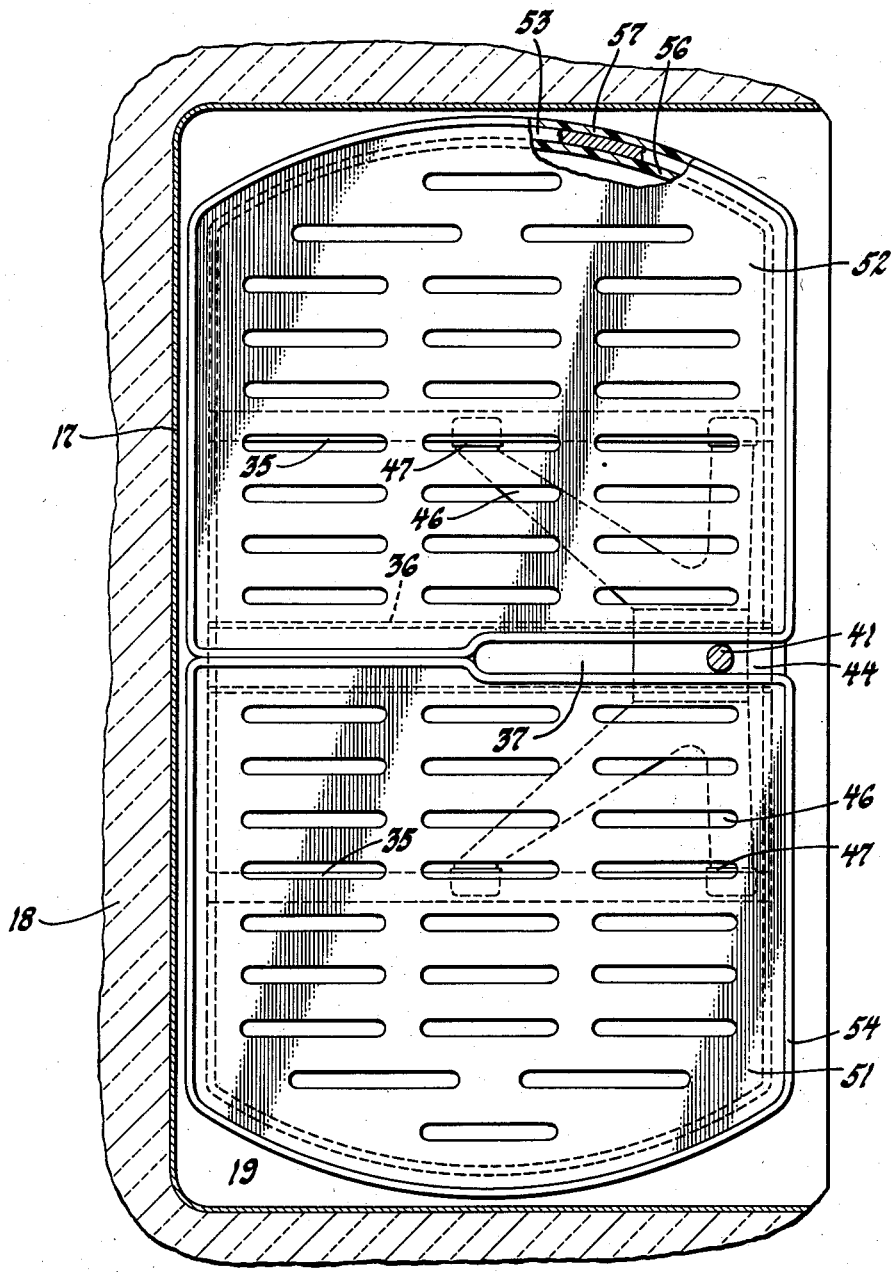
Figure 6 is a view similar to Figure 2 showing a modified version of my slidable and rotatable shelf wherein the shelf is composed of companion sections removable from the refrigerated food compartment.

In order to increase the utility of the refrigerator and of a food shelf member itself I show in Figures 6 and 7 of the drawings a modification of my shelf arrangement wherein a food supporting shelf member is provided by separable half sections 51 and 52 disposed in side by side relation and both detachably carried by a rim or frame 53 similar to the bounding rim or frame of a shelf 30. In this showing the shelf sections 51 and 52 are formed of molded plastic material and are provided with an upwardly raised bounding edge 54 and spaced apart depending flanges 56 and 57 (see Figure 6). The raised edge 54 prevents articles supported on a shelf section from slipping off same and the flanges 56 and 57 form a groove for receiving and detachably interlocking the frame 53 with or to the shelf sections 51 and 52. The shelf in this modified disclosure is slidable and rotatable and/or is revolvable as a unit in the same manner as described with respect to a shelf member 30. In this modified arrangement either half section 51 or 52 of the shelf member can be removed from frame 53 upon sliding the shelf outwardly of compartment 19 and rotating same as is illustrated in Figure 7 of the drawings. This permits one or both of the self sections to serve as trays for the portage of articles or food products to and fro the refrigerator cabinet. For example one of the shelf half sections 51 or 52 may be supporting a plurality of cups or glass dishes in compartment 19 containing dessert, pudding or the like all of which cups may be simultaneously removed from the refrigerator cabinet and carried by a shelf section or tray 51 or 52 to the dinner table. This eliminates the necessity of handling the cups or glasses individually when they are to be removed from the refrigerator and facilitates the act of serving desserts in a chilled state at the dinner table.

While I realize that others have previously provided sliding shelves, rotatable shelves and vertically adjustable shelves per se my shelf arrangement herein disclosed is believed to be novel and unique. I have provided or combined a plurality of movements of a refrigerator shelf into a combination which meets various demands of a housewife and serves to present advantages not heretofore obtained. My novel and improved shelf arrangement provides for maximum food storage or supporting surface within a refrigerator cabinet of minimum external dimensions and increases the accessibility of the food products. Any one of the shelves in my shelf arrangement can be quickly and easily adjusted vertically within a food storage compartment with a movement thereof which is natural in the ordinary use of the shelf and no separate or special mechanism need be actuated or released to change the height of a shelf.

While the form of embodiment of the invention as herein disclosed constitutes a preferred form, it is to be understood that other forms might be adopted, as may come within the scope of the claims which follow.

What is claimed is as follows:

1. In a cabinet provided with walls defining a compartment therein, said compartment having an access opening in one of said walls, a door normally closing said compartment access opening, a shelf member within said compartment, means for adjustably supporting said shelf member in said compartment comprising a jack-screw stationarily secured to said cabinet and a bracket member threaded upon said jack-screw, means on one of said members providing spaced apart substantially parallel rails, means on the other of said members cooperating with said rails to interlock the members together for movement relative to one another, said shelf member being slidable horizontally along said bracket member part way out of said compartment through its access opening when said door is open, said shelf member being rotatable while slid part way out of said compartment to position one side thereof a greater distance outwardly of said compartment than all other portions of the shelf member, and said shelf member being revolvable throughout 360° or more only while the same is slid part way out of said compartment to thread said bracket member interlocked thereto upwardly and/or downwardly along said jack-screw for changing the height of said self member relative to said compartment.

2. In a cabinet provided with walls defining a compartment therein, said compartment having an access opening in one of said walls, a door normally closing said compartment access opening, a plurality of vertically spaced apart shelves within said compartment, means for adjustably supporting one of said shelves in said compartment comprising a jack-screw stationarily secured to said cabinet and a spider-like bracket threaded upon said jack-screw, means on said one shelf providing spaced apart substantially parallel rails, the end of the legs of said spider-like bracket cooperating with said rails to interlock said one shelf to said bracket for movement relative thereto, said one shelf being slidable horizontally along said bracket part way out of said compartment through its access opening when said door is open, said one shelf being rotatable in either direction about said jack-screw while slid part way out of said compartment to position one side thereof a greater distance outwardly of said compartment than all other portions of the shelf, and said one shelf being continuously revolvable throughout 360° or more in either one of two directions only while the same is slid part way out of said compartment to thread said bracket interlocked thereto upwardly and/or downwardly along said jack-screw for varying the height of said one shelf with respect to other of said shelves in said compartment.

3. In a cabinet provided with walls defining a compartment therein, said compartment having an access opening in one of said walls, a door normally closing said compartment access opening, a shelf within said compartment, means for adjustably supporting said shelf in said compartment comprising a jack-screw stationarily secured to said cabinet, a frame member and a bracket member threaded upon said jack-screw, means on one of said members providing spaced apart substantially parallel rails, means on the other of said members engaging and cooperating with said rails to interlock the members together for movement relative to one another, said shelf being in separable side by side sections detachably carried on said frame member, said frame member being slidable horizontally along said bracket member part way out of said compartment through its access opening when said door is open, said frame member being rotatable while slid part way out of said compartment to position one section of said shelf outwardly of said compartment whereby it is readily accessible from the exterior thereof for removal from said frame member and serves as a tray for the portage of articles to and from said cabinet, and said frame member being revolvable throughout 360° or more while slid part way out of said compartment to thread said bracket member interlocked thereto upwardly and/or downwardly along said jack-screw for changing the height of said shelf relative to said compartment.

4. In a cabinet provided with walls defining a compartment therein, said compartment having an access opening in one of said walls, a door normally closing said compartment access opening, a shelf within said compartment, means for supporting said shelf in said compartment comprising an upright support, a frame member and a bracket member pivotally mounted on said support, means on one of said members providing spaced apart substantially parallel rails, means on the other of said members engaging and cooperating with said rails to interlock the members together for movement relative to one another, said shelf being in separable side by side sections detachably carried on said frame member, said frame being slidable horizontally along and with respect to said bracket member part way out of said compartment through its access opening when said door is open, said frame member being rotatable while slid part way out of said compartment about said upright support in either one of two directions to position one section of said shelf outwardly of said compartment whereby it is readily accessible from the exterior thereof for removal from said frame member, and said one shelf section serving when removed from the shelf supporting means as a tray for the portage of articles to and from said cabinet.

5. In a cabinet provided with walls defining a compartment therein, said compartment having an access opening in one upright wall thereof, a door hingedly mounted on said cabinet normally closing said compartment access opening, a shelf member within said compartment, said shelf member having straight parallel front and back sides and curved ends, means for adjustably supporting said shelf member within said compartment with its straight back side adjacent and extending along the rear upright compartment wall, said supporting means comprising an upright jack-screw stationarily secured to said cabinet centrally of the front of said compartment adjacent the access opening thereof and a bracket member threaded upon said jack-screw, means on one of said members providing spaced apart substantially parallel opposed rails, means on the other of said members engaging and cooperating with said rails to interlock the members together for movement relative to one another, said shelf member being slidable horizontally away from said compartment rear wall along said bracket member outwardly of the compartment access opening when said door is open, said shelf member being while slid part way out of said compartment rotatable so as to position one curved end thereof a greater distance outwardly of said compartment than all other portions of the shelf member, and said shelf also being while slid part way out of said compartment revolvable continuously in one direction to thread said bracket member interlocked thereto upwardly and/or downwardly along said upright stationary jack-screw for varying the height of said shelf member.

6. In combination, a cabinet having a compartment therein, a plurality of vertically spaced apart shelves in said compartment, means for supporting said shelves within said compartment, said means including a stationary jack-screw provided with a bracket thereon and having one of said shelves slidably interlocked with said bracket, said one shelf being slidable relative to said bracket and said jack-screw independently of other of said plurality of shelves in a straight line horizontal direction part way out of said compartment, and said one shelf also being rotatable while slid outwardly of said compartment whereby to thread said bracket interlocked thereto along said jack-screw for raising and/or lowering the one shelf relative to said other shelves.

7. In combination, a cabinet having a compartment therein, a plurality of vertically spaced apart shelves in said compartment, means for supporting said shelves within said compartment, said means including a stationary jack-screw provided with a bracket thereon and a frame member slidably interlocked with said bracket, one of said shelves being in side by side separable sections detachably carried on said frame member, said frame member and said one shelf thereon being shiftable relative to said bracket and said jack-screw part way out of said compartment, said one shelf, said frame member and said bracket interlocked thereto being rotatable in either one of two directions about said jack-screw while said one shelf is slid part way out of said compartment to position a section of said one shelf outwardly of the compartment whereby it is readily accessible from the exterior thereof for removal from said frame member, and said accessible section of said one shelf serving when removed from said frame member as a tray for the portage of articles to and fro said cabinet.

8. In combination, a generally rectilinear shaped cabinet having a compartment therein provided with a flat upright back wall, a plurality of vertically spaced apart shelves in said compartment having a substantially straight rear portion adapted to extend along the compartment flat back wall in close proximity thereto, means for supporting said shelves within said compartment, said means including a stationary jack-screw provided with a bracket thereon and having one of said shelves slidably interlocked with said bracket, said one shelf being non-rotatable while its straight rear portion is positioned close to said compartment flat back wall, said one shelf being slidable relative to said bracket and said jack-screw independently of other of said plurality of shelves away from the back wall of said compartment part way out of same, and said one shelf also being rotatable only after being slid part way out of said compartment in one direction throughout 360° or more whereby to thread said bracket interlocked thereto along said jack-screw for varying the height of said one shelf relative to said compartment.

9. In combination, a generally rectilinear shaped cabinet having a compartment therein provided with a flat upright back wall, a plurality of shelves in said compartment having a substantially straight rear portion normally extending parallel to the compartment flat back wall in close proximity thereto, means for supporting said shelves within said compartment, said means including a single one-piece stationarily mounted jack-screw having a frame movably supported thereon, one of said shelves being detachably carried on said frame, means for raising and/or lowering said frame along said stationary jack-screw to adjust the height of said one shelf relative to other of said plurality of shelves, said frame and said one shelf thereon being shiftable relative to said jack-screw independently of said other shelves away from the back wall of said compartment outwardly thereof to locate portions of said one shelf in a readily accessible position in front of the compartment for removal from said frame, and said one shelf serving when removed from said frame as a tray for the portage of articles to and fro said cabinet.

10. In combination, a generally rectilinear shaped cabinet having a compartment therein provided with flat upright side and back walls and an access opening in its front wall, a door on said cabinet normally closing the access opening of said compartment, a plurality of shelves in said compartment having a substantially straight rear portion normally extending parallel to said flat back compartment wall in close proximity thereto, means for supporting said shelves within said compartment, said means including a jack-screw stationarily mounted in said compartment and a frame movably supported thereon, one of said shelves being detachably carried on said frame, said one shelf having a curved edge extending along a flat upright side wall of said compartment, said frame and said one shelf thereon being shiftable relative to said stationary jack-screw independently of other of said plurality of shelves, when said door is opened, away from said flat back wall of the compartment outwardly thereof through its access opening to locate portions of said one shelf exteriorly of said cabinet in a readily accessible position for removal from said frame, said frame being adjustable vertically along said jack-screw for varying the height of said one shelf relative to said other shelves, and said detachable shelf serving when removed from said frame as a tray for the portage of articles to and fro said cabinet.

References Cited in the file of this patent

UNITED STATES PATENTS

| | | |
|---|---|---|
| 901,665 | Walker | Oct. 20, 1908 |
| 2,519,880 | Boddy | Aug. 22, 1950 |
| 2,724,629 | Atchison | Nov. 22, 1955 |
| 2,746,830 | Fonda et al. | May 22, 1956 |
| 2,799,285 | Lines | July 16, 1957 |
| 2,813,635 | Schumacher | Nov. 19, 1957 |